United States Patent
Koizumi et al.

(10) Patent No.: US 8,827,056 B2
(45) Date of Patent: Sep. 9, 2014

(54) DAMPER DEVICE

(75) Inventors: Kazuyoshi Koizumi, Sagamihara (JP);
Akinori Harada, Utsunomiya (JP)

(73) Assignee: Nifco Inc., Yokohama-shi (JP)

( * ) Notice: Subject to any disclaimer, the term of this patent is extended or adjusted under 35 U.S.C. 154(b) by 202 days.

(21) Appl. No.: 13/390,275

(22) PCT Filed: Aug. 3, 2010

(86) PCT No.: PCT/JP2010/063108
§ 371 (c)(1),
(2), (4) Date: Apr. 27, 2012

(87) PCT Pub. No.: WO2011/021501
PCT Pub. Date: Feb. 24, 2011

(65) Prior Publication Data
US 2012/0217107 A1 Aug. 30, 2012

(30) Foreign Application Priority Data
Aug. 18, 2009 (JP) ................................. 2009-189065

(51) Int. Cl.
*F16F 9/48* (2006.01)

(52) U.S. Cl.
USPC ..................................... 188/289; 188/322.14

(58) Field of Classification Search
CPC ........ F16F 9/3242; F16F 9/486; F16F 9/3235
USPC .................... 188/322.14, 281, 289; 16/66, 84
See application file for complete search history.

(56) References Cited

U.S. PATENT DOCUMENTS

| | | | | | |
|---|---|---|---|---|---|
| 3,193,112 | A | * | 7/1965 | Isidorovich et al. | 213/43 |
| 3,265,222 | A | * | 8/1966 | Goldman | 213/43 |
| 3,656,632 | A | * | 4/1972 | Karakashian et al. | 213/43 |
| 3,860,225 | A | * | 1/1975 | Nakamura | 267/64.15 |
| 3,889,994 | A | * | 6/1975 | Edwards | 293/134 |
| 4,110,868 | A | * | 9/1978 | Imazaike | 16/84 |
| 2009/0084645 | A1 | | 4/2009 | Okabayashi | |

FOREIGN PATENT DOCUMENTS

| | | |
|---|---|---|
| JP | U-S-64-53652 | 4/1989 |
| JP | 2008-275138 | 11/2008 |
| JP | 2009-024726 | 2/2009 |

* cited by examiner

*Primary Examiner* — Xuan Lan Nguyen
(74) *Attorney, Agent, or Firm* — Manabu Kanesaka

(57) ABSTRACT

A cylinder body is partitioned by a partition into a first chamber that is divided from an outside by a cap body and a second chamber accommodating a piston body. A flow channel communicating the first chamber and the second chamber with each other is formed in the partition, and a shaft is projected from the partition onto the first chamber side. The cap body includes a through-hole, the shaft is inserted movably in the through-hole from a reference position along an axis line direction of the cylinder body. There is provided a throttle structure that changes a gap between the through-hole and the shaft when the cap body moves from the reference position by a pressure change generated by a movement or a relative movement of the piston body.

8 Claims, 2 Drawing Sheets

DAMPER DEVICE

RELATED APPLICATIONS

The present application is National Phase of International Application No. PCT/JP2010/063108 filed Aug. 3, 2010, and claims priority from Japanese Application No. 2009-189065 filed Aug. 18, 2009.

TECHNICAL FIELD

The present invention relates to an improvement in a damper device that includes a cylinder body and a piston body and damps a movement or a relative movement of a damping object by attaching at least one of the cylinder body or the piston body to the damping object.

BACKGROUND ART

There is Patent Document 1, which has been applied by the inventor, discloses a damper device including a cylinder body, a piston body, a tap body in which a shaft is inserted in a vent hole made in an inner depth portion of the cylinder body, and a spring that urges the tap body. In the damper device, when the piston body moves in a direction in which the piston body is separated from the inner depth portion of the cylinder body, because the cylinder body becomes a negative pressure, an amount of the shaft of the tap body the spring thrusting into the vent hole is increased by an urging force of the spring. Therefore, because an introduction of air into a cylinder through a vent hole is restricted, a damping force acts on the movement of the piston body, and the damping force is used to act on the movement or the relative movement of the damping object.

PRIOR ART DOCUMENT

Patent Document

Patent Document 1: Japanese Patent Publication Laid-Open No. 2008-275138

SUMMARY OF THE INVENTION

Problem to be Solved by the Invention

A main problem to be solved by the invention is to provide a simpler-structure damper device including the cylinder body and the piston body.

Means for Solving the Problem

In order to achieve the object, according to a first aspect of the invention, a damper device includes a cylinder body and a piston body, wherein at least one of the cylinder body or the piston body is attached to a damping object to damp a movement or a relative movement of the damping object, the cylinder body is partitioned by a partition into a first chamber that is divided from an outside by a cap body and a second chamber accommodating the piston body, a flow channel communicating the first chamber and the second chamber with each other is formed in the partition, a shaft is projected from the partition onto a first chamber side, the cap body includes a through-hole, the shaft is inserted movably in the through-hole from a reference position along an axis line of the cylinder body, and the damper device includes a throttle structure that changes a gap between the through-hole and the shaft when the cap body moves from the reference position by a pressure change generated by a movement or a relative movement of the piston body.

In order to achieve the object, according to a second aspect of the invention, a damper device includes a cylinder body and a piston body, wherein at least one of the cylinder body or the piston body is attached to a damping object to damp a movement or a relative movement of the damping object, the cylinder body is partitioned by a partition into a first chamber that is divided from an outside by a cap body and a second chamber accommodating the piston body, a flow channel communicating the first chamber and the second chamber with each other is formed in the partition, a shaft is projected from the partition onto a first chamber side, the cap body includes a through-hole, the shaft is inserted in the through-hole, a hole edge portion of the through-hole of the cap body is deformed by a pressure change generated by the movement or the relative movement of the piston body to move the through-hole onto a partition side, and the damper device includes a throttle structure that changes a gap between the through-hole and the shaft when the movement of the through-hole is generated.

When the piston body is moved or relatively moved in the direction in which the piston body is separated from the partition of the cylinder body by the movement or the relative movement of the damping object, a force that draws the cap body, in which the shaft is inserted in the through-hole while the gap through which the fluid passes is provided between the cap body and the shaft, toward the partition acts on the cap body because the second chamber becomes a negative pressure. In the damper device of the first aspect, when the force acts on the cap body, the cap body is moved from the reference position in the direction in which the cap body comes close to the partition. In the damper device of the second aspect, when the force acts on the cap body, the hole edge portion of the through-hole of the cap body is moved in the direction in which the hole edge portion comes close to the partition. When the movement is generated, the gap is changed by the throttle structure, namely, a sectional area of the gap is reduced. Therefore, the fluid is hardly introduced into the cylinder body from the first chamber side, and the movement or the relative movement of the piston body is damped. Accordingly, a damping force acts on the movement or the relative movement of the damping object.

Specifically, the diameter of the shaft gradually increases toward the partition. Alternatively, a shaft includes a groove gradually decreasing a depth toward the partition, the groove gradually decreasing a width toward the partition, or the groove gradually decreasing the depth and the width toward the partition. Therefore, a resistance against the movement of the piston body is increased as a movement amount of the cap body toward the partition side or a movement amount of the through-hole toward the partition side is increased. Accordingly, the small damping force acting on the piston body, namely, the damping object is generated because the movement amount is small when the movement or the relative movement of the piston body is slow, and the large damping force acting on the piston body, namely, the damping object is generated because the movement amount is large when the movement or the relative movement of the piston body is fast.

Effect of the Invention

According to the invention, the damper device including the cylinder body and the piston body can properly be configured by adding the cap body.

BEST MODE FOR CARRYING OUT THE INVENTION

Figure 1:
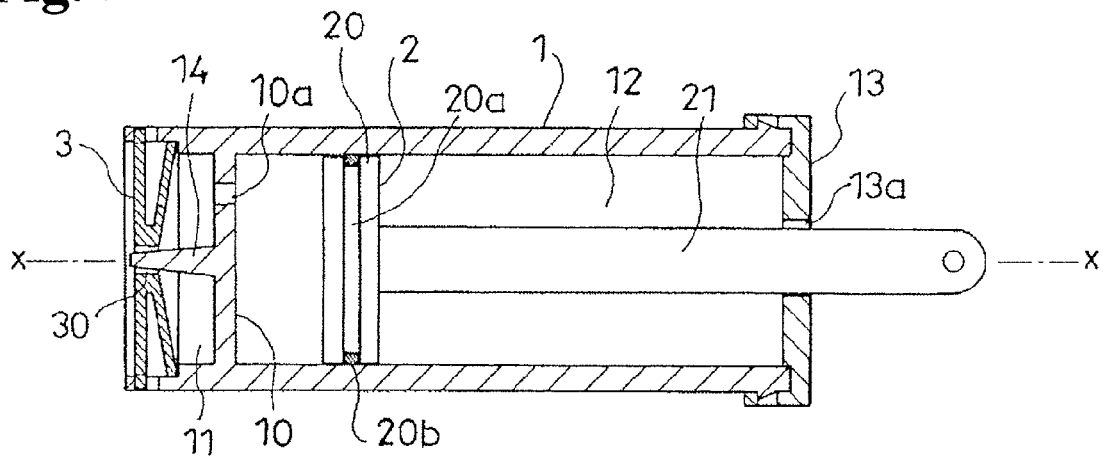
FIG. 1 is a cross-sectional view of a configuration diagram of a damper device.

Hereinafter, an exemplary embodiment of the invention will be described with reference to FIG. 1 to FIG. 6. A damper device according to an embodiment includes a cylinder body 1 and a piston body 2, and the damper device damps movement or relative movement of a damping object (not illustrated) by attaching at least one of the cylinder body 1 or the piston body 2 to the damping object.

For example, when the piston body 2 is attached as a movable body to the damping object while the cylinder body 1 is attached to a fixed body (not illustrated), the movement of the damping object can be damped through the piston body 2 such that the piston body 2 is moved by the movement of the damping object.

When the piston body 2 is attached as the movable body to the damping object while the cylinder body 1 is attached as another movable body to the damping object, the movements of the two damping objects can be damped such that both the cylinder body 1 and the piston body 2 are moved in a direction in which the two damping objects are brought close to or separated from each other.

The cylinder body 1 is partitioned by a partition 10 into a first chamber 11 that is divided from an outside by a cap body 3 and a second chamber 12 accommodating the piston body 2. In examples of the drawings, the cylinder body 1 is formed into a cylindrical shape in which both ends are opened. The partition is formed in a position urged toward one end side of the cylinder body 1. The partition 10 is formed such that a wall surface thereof is orthogonal to an axis line x (a center axis line of the cylinder body 1 in FIG. 1) of the cylinder body 1. A space between the partition 10 and one end of the cylinder body 1 constitutes the first chamber 11, and a space between the partition 10 and another end of the cylinder body 1 constitutes the second chamber 12.

In the examples of the drawings, the piston body 2 includes a short, cylindrical head 20 and a rod 21. An outer diameter of the head 20 is substantially equal to an inner diameter of the cylinder body 1. One end of the rod 21 is coupled to the head 20, and the rod 21 is projected to the outside from another end of the cylinder body 1. The piston body 2 can be attached to the damping object and the like by utilizing the rod 21. A round groove 20a is formed in an outer circumferential portion of the head 20, and a seal ring 20b is fitted in the outer circumferential portion of the head 20 by utilizing the round groove 20a. An end cap 13 is fitted in another end of the cylinder body 1, and another end side of the rod 21 is projected to the outside through a through-hole 13a made in a center of the end cap 13.

A flow channel 10a communicating the first chamber 11 and the second chamber 12 with each other is formed in the partition 10, and a shaft 14 is projected from the partition 10 onto the side of the first chamber 11. In the examples of the drawings, the shaft 14 is formed on an axis line x of the cylinder body 1 while an axis line of the shaft 14 is matched with the axis line x. A base of the shaft 14 is integral with a central portion of the partition 10. A leading end of the shaft 14 is located on a slightly inside of one end of the cylinder body 1. On the other hand, the flow channel 10a is configured as a hole piercing through the partition 10 in a lateral portion of the shaft 14. At least two flow channels 10a may be formed in the partition 10. When the piston body 2 is separated from the partition 10, a fluid (in the example of the drawings, air) is moved from the first chamber 11 to the second chamber 12 by the flow channel 10a. When the piston body 2 comes close to the partition 10, the air is moved from the second chamber 12 to the first chamber 11 by the flow channel 10a.

In the example of FIG. 1 to FIG. 4, the cap body 3 includes a through-hole 30, the shaft 14 is inserted movably in the through-hole 30 from a reference position (a position indicated by a solid line in FIG. 2 and FIG. 3) to the direction of the axis line x of the cylinder body 1. In the example of FIG. 1 to FIG. 4, there is provided a throttle structure that changes a gap y between the through-hole 30 and the shaft 14 when the cap body 3 moves from the reference position by a pressure change generated by a movement or a relative movement of the piston body 2.

Figure 5:
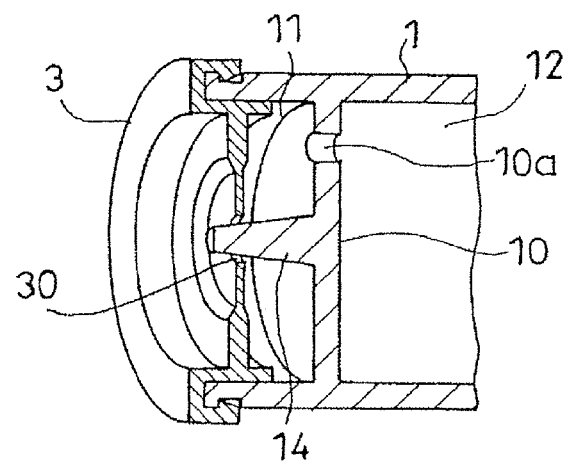
FIG. 5 is a partially broken perspective view of a configuration diagram of the main part illustrating a modification of the cap body of the damper device in FIG. 1 to FIG. 4.
Figure 6:
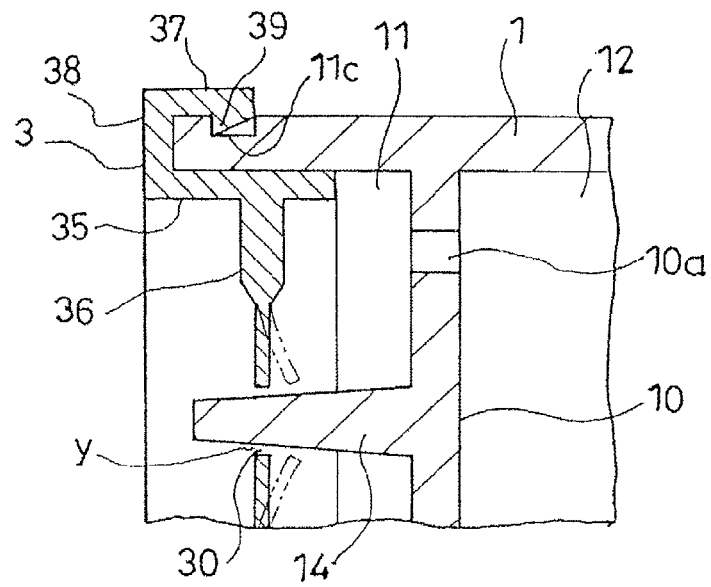
FIG. 6 is a main-part enlarged view of the damper device in FIG. 5 illustrating the outline of the cap body by the alternate long and two short dashed lines (phantom line) when a through-hole is moved.

On the other hand, in the example of FIG. 5 and FIG. 6, the cap body 3 includes the through-hole 30, the shaft 14 is inserted in the through-hole 30, and a hole edge portion of the through-hole 30 is deformed by the pressure change generated by the movement or the relative movement of the piston body 2, thereby moving the through-hole 30 toward the side of the partition 10. In the example of FIG. 5 and FIG. 6, there is provided a throttle structure that changes the gap y between the through-hole 30 and the shaft 14 when the movement of the through-hole 30 is generated.

When the piston body 2 is moved or relatively moved in a direction in which the piston body 2 is separated from the partition 10 of the cylinder body 1 by the movement or the relative movement of the damping object, a force that draws the cap body 3, in which the shaft 14 is inserted in the through-hole 30 while the gap y through which the fluid passes is provided between the cap body 3 and the shaft 14, toward the partition 10 acts on the cap body 3 because the first chamber 11 becomes a negative pressure. In the example of FIG. 1 to FIG. 4, when the force acts on the cap body 3, the cap body 3 is moved from the reference position to the direction in which the cap body 3 comes close to the partition 10. In the example of FIG. 5 and FIG. 6, when the force acts on the cap body 3, the hole edge portion of the through-hole 30 of the cap body 3 is moved in the direction in which the hole edge portion comes close to the partition 10. When the movement is generated, the gap y is changed by the throttle structure, namely, a sectional area of the narrowest point in the direction of the axis line x is reduced in the gap y. Therefore, the fluid is hardly introduced into the cylinder body 1 from the side of the first chamber 11, and the movement or the relative movement of the piston body 2 is damped. Accordingly, a damping force acts on the movement or the relative movement of the damping object.

On the other hand, in the examples of the drawings, when the piston body 2 is moved or relatively moved in the direction in which the piston body 2 comes close to the partition 10 of the cylinder body 1 by the movement or the relative movement of the damping object, the sectional area of the gap y is not reduced, but the fluid is relatively smoothly moved to the outside from the second chamber 12 through the first chamber 11. Therefore the excessive damping force does not act on the movement or the relative movement of the damping object.

In the example of FIG. 1 to FIG. 4, the cap body 3 includes a disc-shaped main body portion 31 in which an outer diameter is substantially equal to an inner diameter of the cylinder body 1 and an elastic portion 32 that locates the cap body 3 in the reference position while the cap body 3 is movable from the reference position. An engagement portion 33 is projected in a radial direction of each of both sides of the main body portion 31, and a window hole 11a receiving the engagement portion 33 is formed in a side portion located between the partition 10 and one end portion of the cylinder body 1, which constitute the first chamber 11. The window hole 11a has a width in which the engagement portion 33 can be moved in the direction of the axis line x of the cylinder body 1, so that the cap body 3, more specifically the main body portion 31 can be moved toward the direction in which the main body portion 31 comes close to the partition 10 from the reference position in which the engagement portion 33 is pressed against an inner wall located on one end side of the cylinder body 1 in the window hole 11a by elasticity of the elastic portion 32. The through-hole 30 is made in a central portion of the main body portion 31. On the other hand, in the examples of the drawings, the elastic portion 32 is also formed into the disc shape in which the outer diameter is substantially equal to the inner diameter of the cylinder body 1. A short cylindrical portion 34 is formed around the through-hole 30 on the side oriented toward the partition 10 of the main body portion 31. The elastic portion 32 is formed to surround a cylinder end on the side of the partition 10 of the short cylindrical portion 34. The elastic portion 32 is formed such that a distance with the main body portion 31 is increased toward an outer edge portion of the elastic portion 32. The elastic portion 32 is inclined in the reference position such that an acute angle is formed between a surface oriented toward the side of the partition 10 and the axis line x of the cylinder body 1. On the other hand, a step portion 11b is formed between the window hole 11a of the first chamber 11 and the partition 10 while oriented toward one end side of the cylinder body 1, and an outer edge portion of the elastic portion 32 abuts on the step portion 11b. The elastic portion 32 locates the cap body 3 in the reference position. (FIG. 2) At this point, when the piston body 2 is separated from the partition 10, the elastic portion 32 is deformed in the direction in which the inclination is relaxed by the pressure change, whereby the main body portion 31 is moved in the direction in which the main body portion 31 comes close to the partition 10.

In the example of FIG. 5 and FIG. 6, the cap body 3 includes a cylindrical portion 35 in which an outer diameter is substantially equal to the inner diameter of the cylinder body 1, a main body portion 36 that is set up to divide a space in the cylindrical portion 35 into two between both the ends of the cylindrical portion 35, and an external cylinder portion 37 that is provided outside the cylindrical portion 35 while being distant from the cylindrical portion 35 by a thickness of the cylinder body 1. One end of the cylindrical portion 35 and one end of the external cylinder portion 37 are integrally coupled by a coupling portion 38. An inwardly-projected engagement projection 39 is formed at another end of the external cylinder portion 37. When the cap body 3 is assembled in the cylinder body 1 such that one end of the cylinder body 1 is fitted between the cylindrical portion 35 and the external cylinder portion 37 of the cap body 3, the engagement projection 39 invades in and engages with an engagement recess 11c formed outside one end of the cylinder body 1, thereby maintaining the assembled state. The through-hole 30 is formed in the center of the main body portion 36. A point that surrounds the through-hole 30 in the main body portion 36, namely, the hole edge portion is formed into a thin film-like shape. When the piston body 2 is separated from the partition 10 to generate the pressure change, the hole edge portion is deformed in the direction in which the hole edge portion comes close to the partition 10, whereby the through-hole 30 is moved in the direction in which the through-hole 30 comes close to the partition 10.

Figure 2:
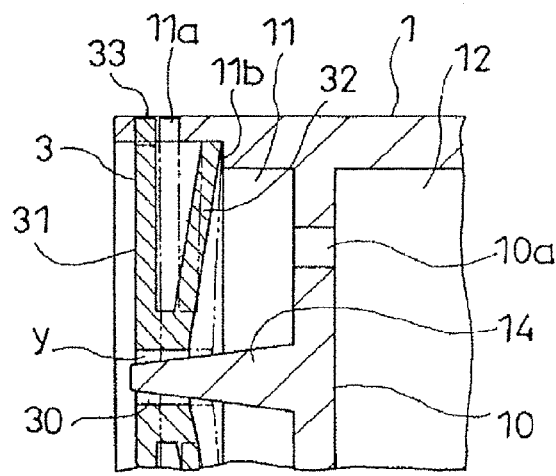
FIG. 2 is an enlarged view of the main-part in FIG. 1 illustrating an outline of a cap body by an alternate long and two short dashed lines (phantom line) when the cap body moves from a reference position.

In the examples of FIG. 2 and FIG. 6, the shaft 14 is configured to be thickened toward the partition 10. Therefore, the gap y is changed, when the movement is generated toward the partition 10 of the main body portion 31 of the cap body 3 as indicated by the phantom line in FIG. 2, or when the movement is generated toward the partition 10 of the through-hole 30 as indicated by the phantom line in FIG. 6. That is, in the examples of FIG. 2 and FIG. 6, the throttle structure is configured by the shape of the shaft 14.

Figure 3:
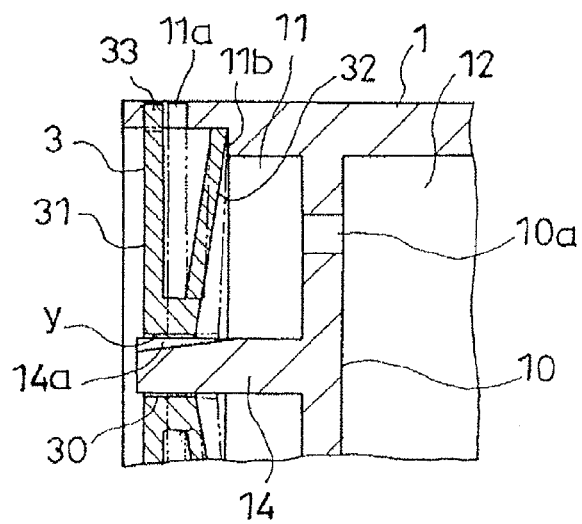
FIG. 3 is a main-part enlarged view illustrating a modification of a configuration of a shaft of a cylinder body in FIG. 1 and FIG. 2, and illustrates the outline of the cap body by the alternate long and two short dashed lines (phantom line) when the cap body moves from the reference position.
Figure 4:
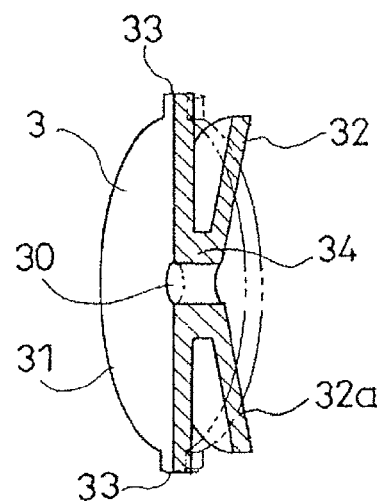
FIG. 4 is a partially broken perspective view illustrating configuration diagram of the cap body constituting the damper device in FIG. 1 to FIG. 3.

In the example of FIG. 3, while the diameter of the shaft 14 is kept constant, a groove 14a is formed in the shaft 14 which gradually decreases the depth toward the partition 10. In an outer surface portion of the shaft 14, the groove 14a starts from the leading end of the shaft 14 and continues along the axis line of the shaft 14. Therefore, the gap y is changed when the movement is generated toward the partition 10 of the main body portion 31 of the cap body 3 as indicated by the phantom line in FIG. 3. That is, in the example of FIG. 3, the throttle structure is configured by the groove 14a.

Instead of the examples of the drawings, the same effect is obtained when a groove is formed in the shaft 14 such that the width of the groove is decreased gradually toward the partition 10, or when a groove is formed in the shaft 14 such that a width and a depth of the groove are gradually decreased toward the partition 10. Alternatively, the shaft 14 may be configured such that the diameter of the shaft 14 is increased toward the partition 10 while the groove is formed.

In this case, a resistance against the movement of the piston body 2 is increased as a movement amount of the cap body 3 toward the side of the partition 10 or a movement amount of the through-hole 30 toward the side of the partition 10 is increased. Therefore, the small damping force acting on the piston body 2, namely, the damping object is generated because the movement amount is small when the movement or the relative movement of the piston body 2 is slow, and the large damping force acting on the piston body 2, namely, the damping object is generated because the movement amount is large when the movement or the relative movement of the piston body 2 is fast.

In the above examples, the air (gas) is used as the fluid. Even if a liquid is used as the fluid, the above examples function in the same way. For example, when the damper device is used while the damping object is dipped in the liquid, or when an external case (not illustrated) is filled with the liquid while the cylinder body 1 is accommodated in the external case, the damping object can be damped by utilizing the liquid.

This application is based upon and claims the benefit of priority from the prior Japanese Patent Application No. 2009-189065, filed on Aug. 18, 2009, the entire contents of which are incorporated herein by reference.

What is claimed is:

1. A damper device comprising:
    a piston body;
    a cylinder body having a partition partitioning the cylinder body to a first chamber, and a second chamber accommodating the piston body;
    a flow channel formed in the partition, and communicating the first chamber and the second chamber with each other;
    a cap body disposed in the first chamber to divide the first chamber from an outside, and including a main body portion with a through-hole, and an elastic portion formed integrally on a central portion of the main body portion and spaced to increase a distance from the main body portion toward a radial direction of the cylinder body; and
    a throttle structure including the through-hole formed in the main body portion, a tapered shaft projecting from the partition into the first chamber through the through-hole so that the main body portion is movable disclosed over the through-hole from a reference position along an axis line of the cylinder body, and a gap arranged between the through-hole and the shaft and being changed when the cap body moves from the reference position by a pressure change generated by a movement or a relative movement of the piston body,
    wherein at least one of the cylinder body or the piston body is adapted to attach to a damping object to damp a movement or a relative movement of the damping object.

2. A damper device comprising:
    a piston body;
    a cylinder body having a partition partitioning the cylinder body to a first chamber, and a second chamber accommodating the piston body;
    a flow channel formed in the partition, and communicating the first chamber and the second chamber with each other;
    a cap body disposed in the first chamber to divide the first chamber from an outside; and
    a throttle structure including a through-hole formed in the cap body, a tapered shaft formed on the partition and projecting into the first chamber through the through-hole, a hole edge portion of the through-hole of the cap body having a thickness less than that of the other portion of the cap body to be flexible to deform by a pressure change generated by a movement or a relative movement of the piston body to move over the through-hole toward a partition side, and a gap arranged between the through-hole and the shaft and being changed when the movement of the through-hole is generated,
    wherein at least one of the cylinder body or the piston body is adapted to attach to a damping object to damp a movement or a relative movement of the damping object.

3. A damper device according to claim 1, wherein a thickness of the shaft gradually increases toward the partition.

4. A damper device according to claim 1, wherein the shaft includes a groove, which gradually decreases a depth toward the partition, gradually decreases a width toward the partition, or gradually decreases the depth and the width toward the partition.

5. A damper device according to claim 4, wherein the cylinder body comprises a step portion formed on a wall of the cylinder body between the cap body and the partition so that an outer edge portion of the elastic portion is fitted to the step portion.

6. A damper device according to claim 5, wherein the main body portion of the cap body comprises an engagement portion projecting in the radial direction of the cylinder body to engage the cylinder body, and
    the wall of the cylinder body includes a window hole formed between the partition and one end of the cylinder body, to receive the engagement portion.

7. A damper device according to claim 2, wherein the cap body further comprises:
    a cylindrical portion having an outer diameter substantially equal to an inner diameter of the cylinder body,
    a main body portion to divide the first chamber from the outside,
    an external cylinder portion formed on the cylindrical portion and disposed outside the cylinder body, the external cylinder portion having a distance from the cylindrical portion by a thickness of the cylinder body, and
    a coupling portion integrally coupling one end of the cylindrical portion and one end of the external cylinder portion to fit the one end of the cylinder body.

8. A damper device according to claim 7, wherein the cylinder body further comprises an engagement recess formed on an outer surface of one end thereof, and
    the cap body further comprises an inwardly-projected engagement projection formed at another end of the external cylinder portion to engage with the engagement recess of the cylinder body.

* * * * *